July 7, 1942.   L. J. LYONS   2,288,635
JOURNAL BEARING
Filed March 4, 1940   2 Sheets-Sheet 1

INVENTOR.
Lee J. Lyons.
BY Charles B. Rasmussen
ATTORNEY.

July 7, 1942.         L. J. LYONS         2,288,635
JOURNAL BEARING
Filed March 4, 1940          2 Sheets-Sheet 2
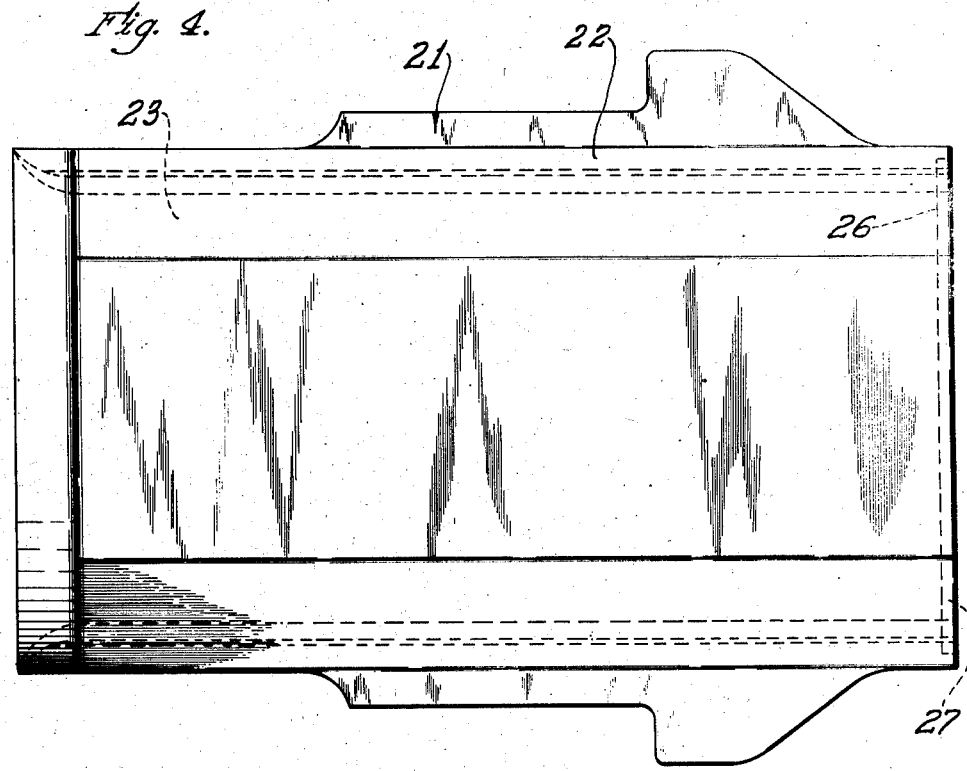
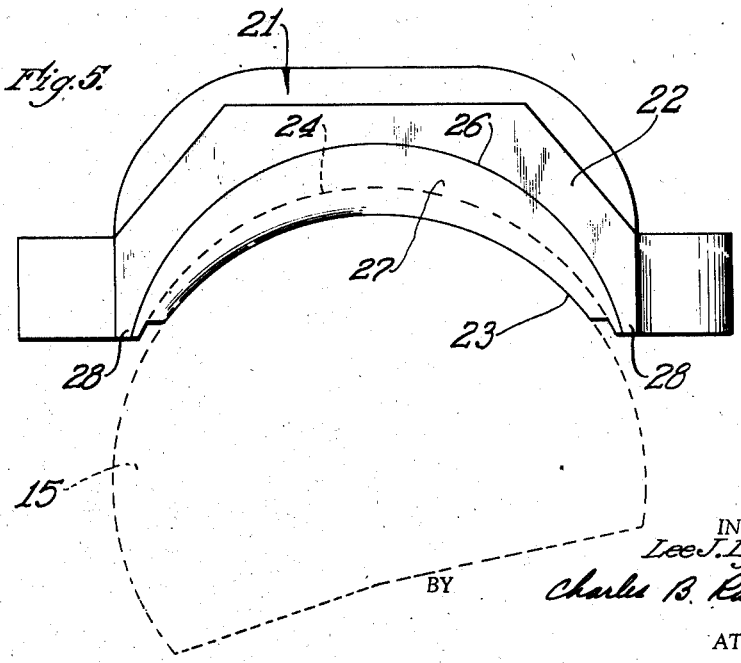
INVENTOR.
Lee J. Lyons.
BY Charles B. Rasmussen
ATTORNEY.

Patented July 7, 1942

2,288,635

UNITED STATES PATENT OFFICE 2,288,635

JOURNAL BEARING

Lee J. Lyons, St. Louis, Mo., assignor to Magnus Metal Corporation, Chicago, Ill., a corporation of New York Application March 4, 1940, Serial No. 322,075

2 Claims. (Cl. 308—56)

This invention relates in general to bearings and more particularly to composite journal bearings having a main body or backing portion of brass, bronze, or other relatively hard metal, and a lining or bearing facing of any suitable type of relative soft bearing metal.

Heretofore, in the use of such ordinary journal bearings, the usual steel collar provided at the outer end of the journal associated therewith has had direct contact with the unfinished end surface of the relatively hard backing portion of the bearing. This has resulted in end heating of the bearing, and cutting, abrasion and wear of the journal collar. The resulting roughening of the collar of the journal causes strands of waste to climb the journal adjacent the collar, and often develops "hot boxes." In addition, contact of the journal collar on the end of the bearing at the line of joinder of the lining and the backing portion, causes penetration of the lubricating oil into the bearing along the bonded surface between the backing and the lining. This results in cracking and chipping, and eventually failure of the bearing lining, since substantialy all lubricating oils may contain napthenic and free fatty acids, which have a corrosive effect upon the solder or other bond employed between the backing portion and the lining of the bearing.

A principal object of the instant invention, therefore, is the provision at the outer or lug end of a composite journal bearing of a vertically disposed inset in the backing portion of the bearing, for contact with the end collar of the journal, which comprises a continuation of the lining portion of the bearing.

Another important object of the invention is the reduction and substantial elimination of end heating of a journal bearing by the provision of such an insert of relatively soft bearing metal.

A further important object of the invention is to prevent contact of the end collar of the journal with the line of joinder of the lining and the backing portion of the bearing, so that the lubricating oil will not have access to the bonded surface between the backing and the lining from the end of the bearing, thereby eliminating failure of the bearing at such point due to the corrosive action of the oil upon the bond employed.

Another important object of the invention is to reduce wear and prevent roughening and abrasion of the end collar of a journal, and to thus reduce the tendency of strands of waste to climb the journal adjacent the collar.

A further important object of the invention is to increase the service life of a journal bearing and the journal associated therewith by materially reducing end friction and wear.

Numerous other objects and advantages of the invention will be apparent as it is better understood from the following description, which, when taken in conection with the accompanying drawings, discloses a preferred embodiment thereof.

In the drawings:

Figure 4 is a top plan view of a slightly modified form of journal bearing; and

Figure 5 is an end view, similar to Fig. 3, of the modified bearing of Fig. 4.

Figure 1:
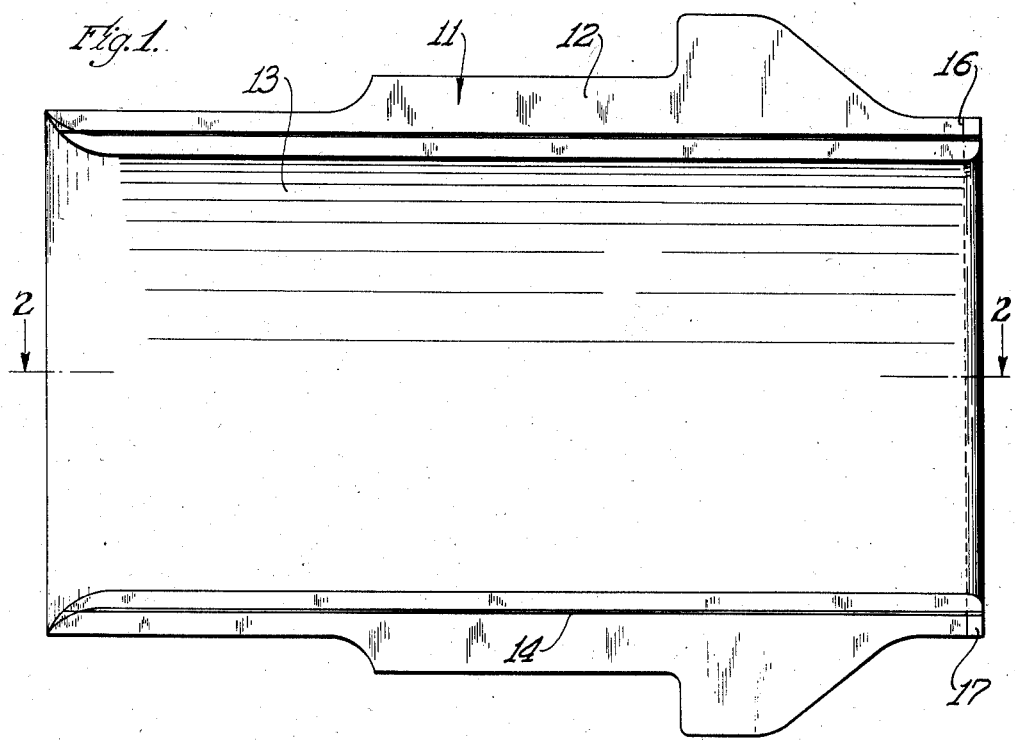
Figure 1 is a bottom plan view of a journal bearing embodying the features of the invention.
Figure 2:
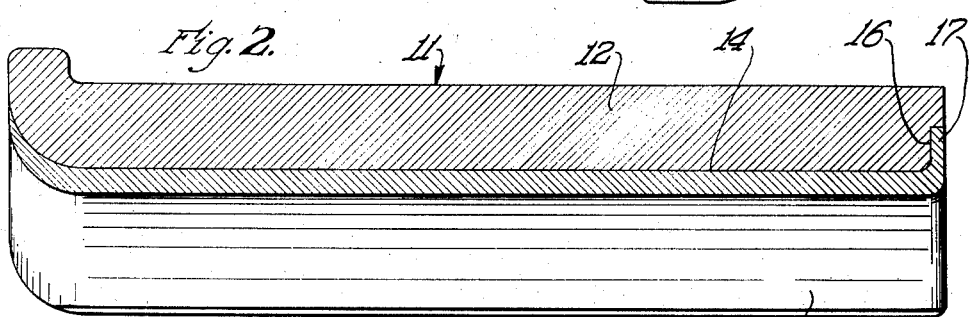
Figure 2 is a vertical, longitudinal section taken substantially on the line 2—2 of Fig. 1.
Figure 3:
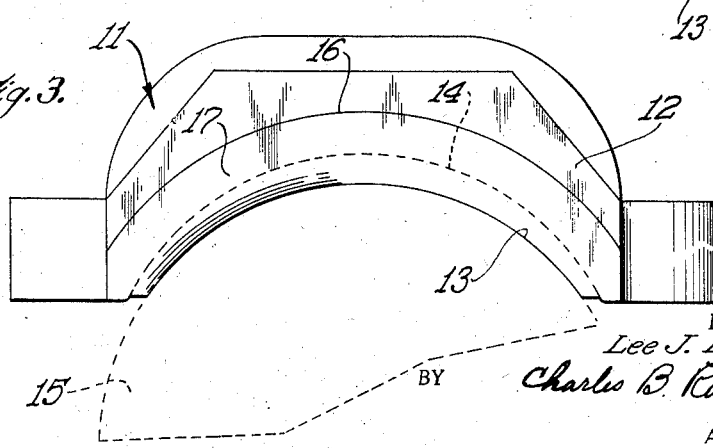
Figure 3 is an end elevation of the bearing as it appears from the right end of Figs. 1 and 2.

Referring more particularly to Figs. 1 to 3 of the drawings, reference numeral 11 indicates in general a composite journal bearing made up in the usual manner of a body or backing portion 12 of brass, bronze, or any other relatively hard metal, and a lining portion 13 of any suitable relatively soft bearing metal, such as Babbitt, Frary metal, Bahnmetall, "Satco" metal, or the like. Because of its superior impact resisting and wearing qualities, it is preferred that "Satco" metal be used for the lining 13 of the bearing. As an example, "Satco" metal may be composed of the following elements in proportions by weight substantially as follows:

| | Per cent |
|---|---|
| Calcium | 0.50 |
| Tin | 1.00 |
| Mercury | 0.25 |
| Magnesium | 0.05 |
| Aluminum | 0.03 |
| Lead to make up | 100.00 |

As is usual in this type of composite journal bearing, the backing portion 12 is provided with a lower concave surface 14 (Fig. 2) upon which the lining 13 is cast. Before the lining 13 is cast onto the backing portion 12, the curved surface 14 is covered with a suitable flux and then with a coating of solder having the desired characteristics to provide a bond between the different metals of the backing portion and the lining. As has been explained hereinbefore, the bond on the joinder surface 14 between the backing portion 12 and the lining 13 of the bearing has been found to be harmfully effected by the corrosive action of the acids which may be contained in the lubricating oil employed in conjunction with such a bearing. In the casting of the lining 13 upon the backing portion 12, the lower surface of the former is shaped to substantially conform to the diameter of the particular size of journal with which the bearing is intended to be used. A portion of the journal is shown in broken lines in Fig. 3, and is indicated therein by reference numeral 15. It is also customary to subsequently machine this bearing surface of the lining to facilitate the initial running in of the bearing.

In the use of such a journal bearing, the inner surface of the usual collar provided on the end of the journal 15 (not shown) contacts the outer or lug end of the bearing 11, which is the right hand end of the bearing in Figs. 1 and 2. Since this end collar extends beyond the peripheral surface of the journal 15 a distance substantially greater than the thickness of the lining portion 13, its inner vertical surface will come into contact with the unfinished end surface of the relatively hard backing portion 12 of the bearing.

The instant invention contemplates the provision of an insert in the outer or lug end of the bearing, which comprises a continuation of the lining 13, against which the inner surface of the end collar of the journal 15 is adapted to contact. Such an insert is formed by providing an arcuate-shaped recess 16 (Fig. 2) in the outer end of the backing portion 12 and filling the same with the relatively soft bearing metal of the lining portion 13 as the latter is cast upon the body 12. This insert is indicated by reference numeral 17 in Figs. 1 to 3, and its outer surface is cast flush with the end surface of the backing portion 12.

The insert 17 preferably extends substantially a quarter of an inch above the periphery of the collar on the end of the journal 15. As a result, the end collar of the journal will contact only the relatively soft bearing metal employed for the lining 13 of the bearing, so that end heating of the bearing, which normally results in the prior art constructions, is substantially eliminated. Due to the resulting lessening of friction between the end collar of the journal and the outer end of the bearing, wear of the journal and the bearing is materially reduced, and roughening and abrasion of the end collar of the journal is entirely eliminated. In the prior art constructions, when foreign matter becomes lodged between the outer end of the bearing and the inner surface of the collar on the end of the journal, the latter is roughened and cut, which, in addition to causing end heating of the bearing, also causes strands of waste to climb the journal adjacent the collar. This has been found to be a frequent cause of "hot boxes." These undesirable results are prevented by the use of the instant insert 17, because any foreign material which may be picked up by the collar on the end of the journal will become embedded in the relatively soft metal of the insert. Consequently, such foreign matter serves to polish the collar, instead of cutting it as it would normally do in a conventional type of bearing.

The insert 17 has the additional important advantage of preventing contact of the end collar of the journal 15 with the line of joinder of the lining 13 and the backing portion 12 of the bearing. As a result, the lubricating oil that is used in conjunction with such bearings will not have access to the bonded surface 14 between the backing and the lining from the outer end of the bearing. Cracking, chipping, and ultimate failure of the lining at such point, due to the corrosive action of the oil upon the bond employed, is thus entirely eliminated. The material reduction of friction between the collar of the journal and the end of the bearing, in addition to the other advantages of the insert 17 above described, increases the service life of both the bearing and the journal.

In Figs. 4 and 5, a modified type of construction is illustrated in which the shape of the soft metal insert at the outer end of the bearing is somewhat altered from that of Figs. 1 to 3. In this modified construction, the bearing is indicated generally by reference numeral 21 and comprises a backing portion 22 and lining 23 which are substantially identical to the members 12 and 13, respectively, of Figs. 1 to 3. The backing portion 22 is provided with a lower concave surface 24, similar to the surface 14 of the body 12, upon which the lining 23 is cast. At its outer or lug end, the backing portion 22 is provided with an arcuate recess 26 which is intended for the same purpose as the recess 16 in the backing portion 12. The upper surface of the recess 26, however, rather than being concentric with the peripheral surface of the journal 15 as is that of the recess 16, is disposed eccentrically thereto, so as to terminate at each side of the bearing at the under surface thereof as shown in Fig. 5. An insert 27 comprising a continuation of the lining 23 is disposed in the recess 26 in the same manner as the insert 17 is disposed in the recess 16. However, due to the eccentric curvature of the upper surface of the recess 26, portions of the body 22 of the bearing are left at 28 (Fig. 5) adjacent the lower ends of the recess 26 which are not present in the bearing 11 of Figs. 1 to 3. These portions 28 of the body 22 of the bearing 21 constitute retaining means for the lower ends of the insert 27. Any tendency of the relatively soft bearing metal of the insert 27 to squeeze out at the edges is thus prevented, and the modification of Figs. 4 and 5 is better adapted than that of Figs. 1 to 3 for bearings which are subjected to particularly severe end thrusts.

In the construction of the above described bearings, the end recesses 16 and 26 may be formed in the casting of the backing portions 12 and 22, or they may be subsequently machined therein, as desired. The advantages hereinbefore described relative to the insert 17 are present to the same degree in the modified construction of Figs. 4 and 5. It will be noted, particularly from Fig. 2, that the inserts 17 or 27 perform the additional function of aiding in retaining the lining on the backing portion of the bearing.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A bearing for a journal having a collar on the end thereof, comprising a backing of relatively hard metal having a lower concave surface, a lining of relatively soft metal cast on said concave surface and having a journal engaging surface, said backing being provided with a recess in the outer end thereof, and an insert cast in said recess integrally with said lining for contact with the inner surface of said collar, and to prevent longitudinal flow of oil between said lining and said backing, the lower edge of said insert having substantially the same radius as the main portion of said journal, and the upper edge of said insert being eccentrically exposed relative to said lower edge and of sufficiently greater radius than the latter to extend beyond the peripheral surface of said collar at all points, thereby preventing any contact between said backing and said collar, said backing having side portions at the bottom thereof to prevent lateral squeezing out of the insert.

2. A bearing for a journal having a collar on the end thereof, comprising a backing of relatively hard metal having a lower concave surface, a lining of relatively soft metal cast on said concave surface and having a journal engaging surface, said backing being provided with a recess in the outer end thereof with an upper surface eccentric to said lower concave surface and spaced therefrom at its upper portion above the peripheral surface of said collar, and an insert disposed in said recess for contact with the inner surface of said collar and formed integrally with said lining, the lower portions of said backing adjacent said recess constituting retaining means for said insert, said insert being of such extent with respect to said collar as to prevent any contact between said collar and said backing.

LEE J. LYONS.